Sept. 20, 1932.　　W. R. GRISWOLD　　1,878,129
BALANCING MACHINE
Filed March 5, 1928　　2 Sheets-Sheet 1

Inventor
WALTER R. GRISWOLD
By Miller Tibbetts
Attorney

Sept. 20, 1932.  W. R. GRISWOLD  1,878,129

BALANCING MACHINE

Filed March 5, 1928  2 Sheets-Sheet 2

Inventor
WALTER R. GRISWOLD
By Miller Tibbets
Attorney

Patented Sept. 20, 1932

1,878,129

UNITED STATES PATENT OFFICE

WALTER R. GRISWOLD, OF DETROIT, MICHIGAN, ASSIGNOR TO PACKARD MOTOR CAR COMPANY, OF DETROIT, MICHIGAN, A CORPORATION OF MICHIGAN

BALANCING MACHINE

Application filed March 5, 1928. Serial No. 259,152.

This invention relates to the balancing of rotating parts, such as engine crank shafts, and to machines for determining and indicating the location and amount of unbalance in such parts.

It has for one of its objects to provide a balancing machine in which the part to be balanced shall be rigidly supported in correct balancing position on the frame of the machine.

Another object of the invention is to provide such a balancing machine in which deflection and misalignment of the parts to be balanced shall be prevented, and errors in the determination of the unbalance resulting from such causes, shall be minimized.

Another object of the invention is to provide a balancing machine in which the rotating parts, including the part to be balanced, shall be rigidly supported in the axis of rotation during the operation of the machine.

Other objects of the invention will appear from the following description taken in connection with the drawings, which form a part of this specification, and in which.

Figure 1:
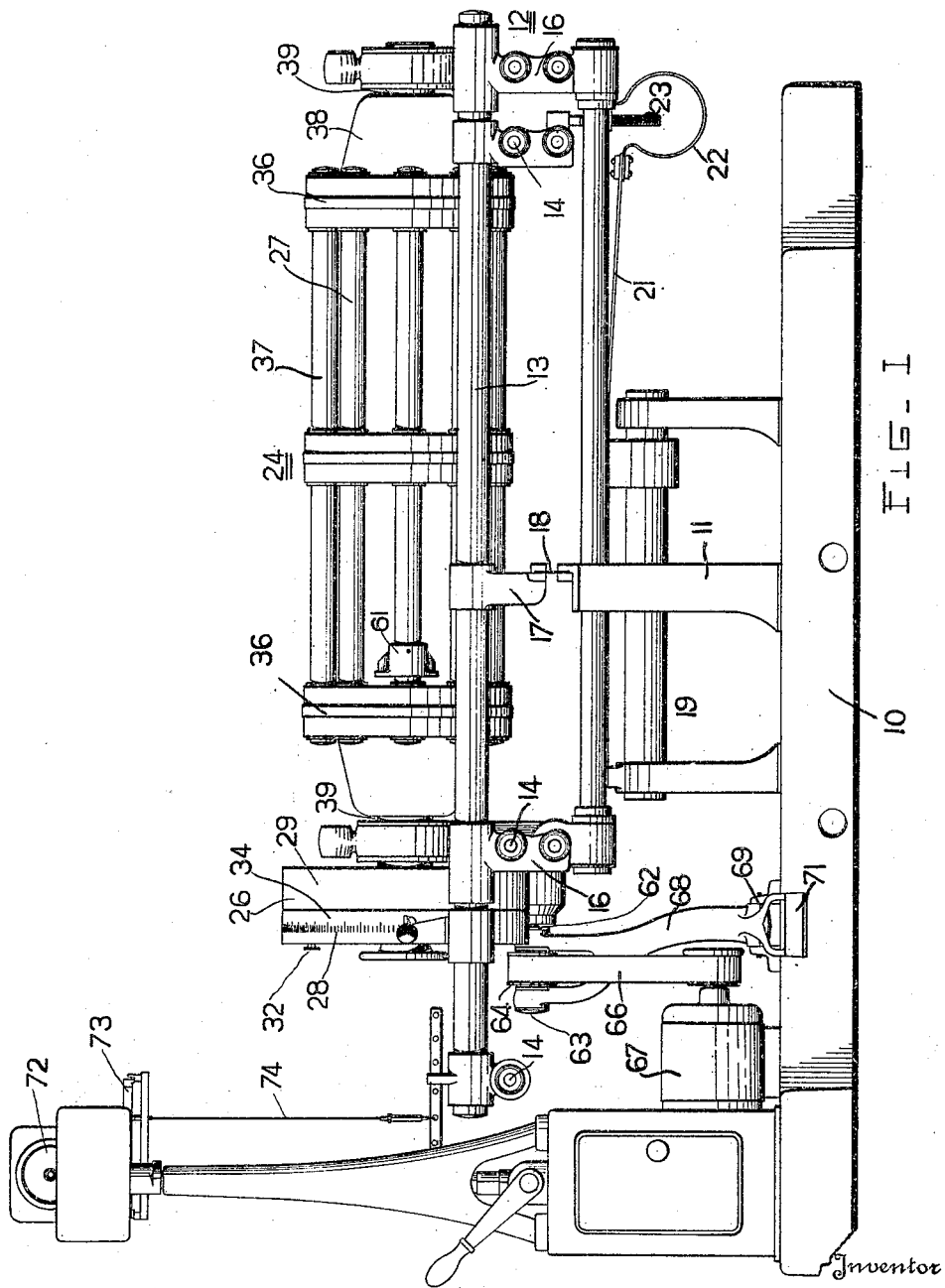
Fig. 1 is a side elevation of a machine constructed in accordance with this invention, parts thereof being broken away to more clearly show the construction.

The actual balancing of a rotatable part consists in varying the mass distribution thereof so as to eliminate unbalanced mass moments, that is it consists in adding mass to or taking mass from predetermined places on the part. However, the preliminary determination of the amount and position of such correction has come to be known in the art as balancing, and is herein so referred to. It has been heretofore proposed to determine the dynamic unbalance of such rotating parts as the crank shafts of internal combustion engines in a machine having a pivotally mounted frame on which the crank shaft or other part is mounted, and which is arranged to tilt from its normal position in response to the forces caused by the unbalanced mass, acting through its particular lever arm. The present invention has been disclosed in connection with the balancing of an automobile engine crank shaft on such a machine, but it is to be understood that the invention is not limited either to machines of this type or to the balancing of crank shafts, but may be applied to the balancing of any rotating part on balancing machines of various types.

The tilting or rocking movement of the frame of the machine is communicated to suitable recording apparatus, and furnishes an indication of the amount and position of the unbalanced mass in the particular shaft to be balanced. In machines of this nature as heretofore constructed, the tiltable frame has been provided with rollers or half bearings, on which the part to be balanced is supported at its ends, this part being connected at one end to the driving and indicating drum of the machine. This connection is of necessity a removable connection, so that slight errors in the alignment of the part with respect to the drum may readily occur, and result in relatively large errors in the determination of the unbalance.

Moreover, in such balancing of the long crank shafts now in frequent use in motor vehicles, the shaft is supported only at its ends and is subject to considerable deflection at its mid-portion, thus introducing further errors into the determination of the unbalance. It has been discovered that a deflection at the center of a shaft of two to three ten thousandths of an inch will introduce errors such as to render the accurate balancing of the shaft impossible. The present invention provides a device in which such errors are prevented and accurate balancing insured. It contemplates the provision of a rigid support for the part, this support being of itself in accurate balance, in which the part is clamped with its axis on the axis of rotation during the balancing operation.

Referring to the drawings, at 10 is shown the base or bed plate of a machine on which are mounted a pair of upwardly extending standards such as 11. Disposed above and normally parallel to the bed plate 10 is a frame indicated generally at 12, which is composed of longitudinal members 13 and transverse members 14, rigidly secured together by suitable fastening means, such as clamps 16. These members may be conveniently formed of rods or they may be tubular if desired. The frame 12 is provided at its mid-portion with a pair of supporting fixtures such as 17 by which it is pivotally mounted on the standards 11. As shown, this mounting means comprises flat or leaf springs 18 which are clamped to the fixture 17 and to the standards 11, but it is to be understood that any suitable means permitting the frame 12 to tilt from its normal position with respect to the base 10, may be employed.

The base 10 is also provided with a fixture 19, to which is secured a spring 21, disposed longitudinally of the machine, and which projects from the fixture and is connected at its outer end to the frame 12, as by a spring link 22 and an adjusting bolt 23. This spring member 21 urges the frame toward its normal or level position and resists any deflection from such position.

The rotatable element of the machine is indicated generally at 24 and comprises a driving and balancing drum 26, connected to and rotatable with a rigid work supporting member or housing 27. The drum 26 is of the well known construction comprising a pair of cylindrical drums or weight members 28 and 29, which are coaxial, and which may be angularly adjusted with respect to each other. These members may be suitably clamped together to rotate as one in any adjusted position. The member 28 is provided with a radially disposed slot (not shown) in which a balance weight 32 is slidably mounted so that it may be adjustably secured by any suitable clamp in any desired position radially of the drum 28. This member is also provided with a circumferential scale 34 by which the relative angular position of the drums 28 and 29 may be readily determined.

The work supporting member or housing 27 may be of any suitable construction but as shown is in the form of a cage comprising transverse members or heads 36, and longitudinally disposed members such as rods or tubes 37 rigidly connecting the transverse members. The end members 36 constitute supporting heads and are provided with end portions 38 in each of which a trunnion 39 is rigidly secured, coaxially with the member 27. One of the trunnions 39 projects into the balancing drum 26, and forms the means whereby this drum is secured to the work supporting member 27.

These trunnions 39 are journaled in bearings 41, which are preferably of any suitable anti-friction type such as the ball bearings shown, and which are mounted in standards or pedestals 42 mounted on cross members of the frame 12. These bearings are of generous size and the pedestals 42 are of a rigid construction adapted to support the trunnion 39 accurately in line with the axis of rotation of the balancing drum 26.

The transverse members 36 may be of any suitable construction, but in the embodiment shown they are formed of rim portions 46 cooperating with disks or web portions 47. The rim portions 46 are preferably formed with spaced lugs 48 through which the longitudinal members 37 extend and in which they are rigidly secured in any convenient manner, as by being pressed therein. The transverse members are also formed with radially extending integral webs 49, extending from a hub boss 50 to each of the bosses 48, by which these transverse members are additionally stiffened.

Figure 3:
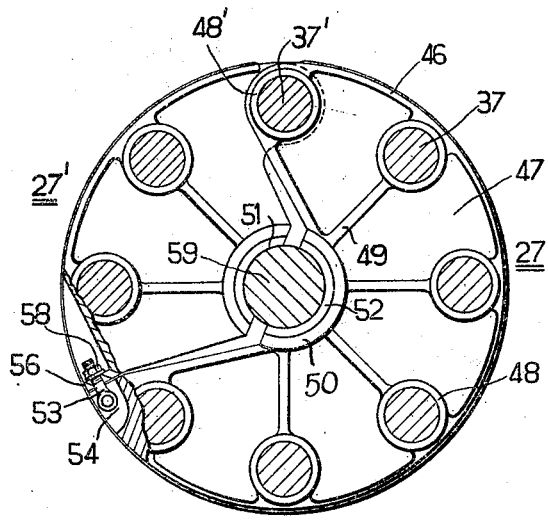
Fig. 3 is a section substantially on the line 3—3 of Fig. 2.
Figure 4:
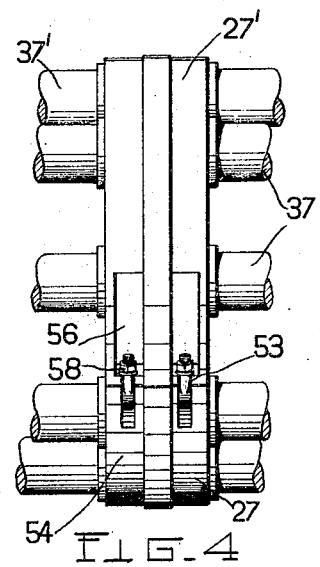
Fig. 4 is a detail view of the clamp locking means.

Means is provided in the work supporting member 27 for rigidly clamping the crank shaft, or other part to be balanced, in axial alignment therein. This is provided by dividing the supporting member 27 longitudinally into two parts, the transverse members 36 being split so that their hub portions 50 may be arranged to support the cooperating members 51 and 52 of a clamp, adapted to engage the work. One of these parts is hinged to or otherwise removably secured to the other part to form a closure therefor. The closure portion may be readily connected to the remainder of the member 27 by forming one of the longitudinal members as a hinge pin, the bosses through which this member passes having sufficient clearance to operate thereon as the eye of the hinge. This construction is best shown in Fig. 3 in which 48' is the hinge eye and 37' the pin. The portion 27' of the member 27 is thus adapted to close a longitudinal opening in said member, through which the work to be balanced may be readily inserted and removed.

Figure 2:
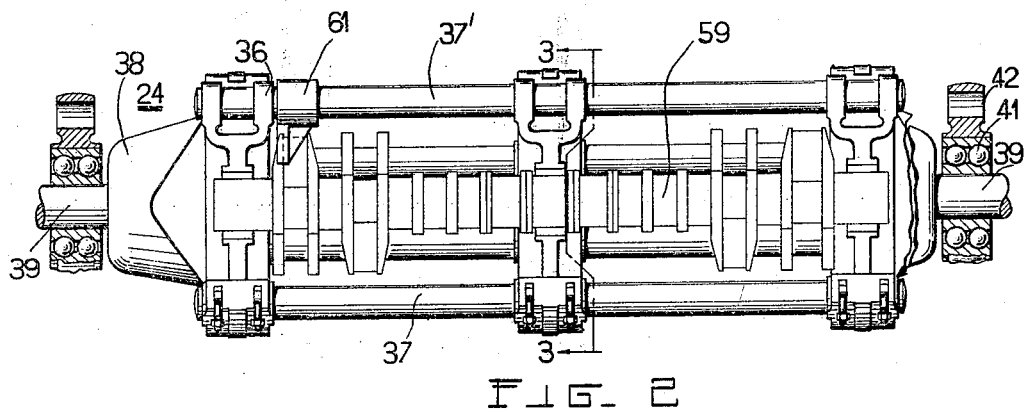
Fig. 2 is a plan view of the work supporting member, partially in section and partially broken away, the closure member being removed to more clearly show the construction.

The meeting edges of the members 27 and 27' opposite to the hinge 37' are provided with suitable means to secure the supporting member in closed position. This is effected in the arrangement shown by clamp bolts 53, pivotally attached to lugs 54 on the member 27, and adapted to pass through slots in cooperating lugs 56 on the member 27', being secured thereto by nuts 58. These bolts 53 not only secure the closure member 27' in position over the opening in the member 27 but they also serve to bring the members 51 and 52 into clamping position on the part to be balanced. This part is shown in Fig. 2 as an engine crankshaft 59, mounted in position within the member 27. It will be observed that there are three of the clamps 51, 52, one of which is disposed in each of the transverse members 36, and the cooperating members of each of these clamps are adapted to engage a bearing portion on the shaft 59 whereby it is rigidly clamped in balancing position. In this position it is rigidly supported with its axis of rotation accurately coincident with the axis of rotation of the supporting member. Suitable means is also provided to prevent any turning of the shaft 59 with respect to the member 27. As shown in Figs. 1 and 2, this means may comprise a work engaging member 61, fixed upon one of the longitudinal members 37 and adapted to engage one of the crank pins of the shaft 59 to prevent turning of this shaft with respect to the member 27.

The rotatable element 24 of the machine is adapted to be driven up to a speed above the critical speed of the shaft 59 by any well known means, which as shown comprises a releasable friction drive including a friction wheel 62, adapted to engage the periphery of the portion 29 of the balancing drum. This wheel is mounted on a shaft 63 driven by a pulley 64 and a belt 66 from any convenient source of power, such as an electric motor 67. The shaft 63 with its pulley 64 and driving wheel 62 are preferably carried on a rock lever 68, pivotally mounted as at 69 to the bed 10 of the machine, and provided with a suitable treadle 71. By means of this device the wheel 62 may be brought into driving engagement with the drum portion 29, so that the drum device 26, and the supporting member 27 with the shaft clamped in coaxial position thereon, may be brought up to a speed beyond the critical speed of the shaft. The drive may be then disengaged, to permit the member 27 and the shaft 59 to slow down through said critical speed.

The machine is also provided with suitable indicating mechanism which as shown consists of a recording indicator 72 operable by means of a lever 73 which is connected to and driven from the tilting frame 12 through a rod or cable 74. This device has suitable mechanism for both indicating the swinging or tilting movements of the frame 12 and also recording the maximum movement thereof, so that the operator of the machine may be readily advised not only of the time, but of the extent of maximum movement of this frame. As mechanisms of this nature are well known in the art to which this invention relates further disclosure thereof is deemed unnecessary.

The operation of the machine will be readily understood from the above disclosure. With the rotary element at rest, the closure 27' of the work supporting member is opened on the hinge pin 37' and the shaft to be balanced is laid in the clamping portions 52, one of its cranks being engaged by the positioning member 61. The member 27' is then closed on its hinge, thus bringing the clamping member 51 into engagement with the shaft to be balanced and rigidly clamping it against the member 52. The parts of the supporting member 27 are secured in this clamped position by closing and tightening the clamping bolts 53, as will be readily understood.

The operator now engages the friction drive with the drum 29 by means of the lever 68 and pedal 71, so that the rotating element of the machine is driven from the motor 67. The speed is increased until the parts are rotating above the first critical shaft speed, when the drive is disengaged and the parts are allowed to slow down. While passing through the critical speed, the unbalanced mass of the shaft 59, acting upon the frame 12, will cause a rocking or tilting motion of the frame upon the pivotal supports 18, which motion is recorded on the device 72 and furnishes an index of the position and amount of the out of balance masses, as is well understood. The exact position and amount of unbalanced masses can then be more nearly determined by moving the indicating portion of the drum relative to the driving portion 29, and by adjusting the weight 32 radially on this member, these adjustments corresponding to the angular position, and to the amount of the unbalance respectively. The operator then repeats the operation and if the calculated unbalance, as compensated by his setting of the drum 28 and the weight 32 is correct the shaft will now rotate through its critical speed without disturbance. If incorrect further trials are necessary until balance of the shaft is secured. The position and size of the weight 32, and the relative position of the drums 28 and 29 now furnishes an accurate index of the position and amount of balancing necessary to be applied to the shaft 59. After balancing the shaft in this position it is reversed end for end within the supporting member 27 and the operation repeated for the other end of the shaft.

From the foregoing description it will be evident that this invention provides a balancing machine in which the correct coaxial balancing position of the shaft or other part to be balanced is rigidly maintained during the balancing operation, any deflection or other deviation from this position which may occur, being negligible. This freedom from deflection is particularly marked in the balancing of long crank shafts because of the support provided at the center of such shafts by the intermediate transverse member of the machine. The rotatable element of the machine is of itself in accurate balance and it is therefore obvious that any unbalance during the operation of the device must be due to unbalanced masses in the shaft which is carried by the machine, which unbalance may be readily detected and corrected.

It will also be apparent that errors in the result caused by wear and misalignment in the bearings supporting the rotatable element are minimized by reason of the size of the bearings and the rigidity of their mounting, made possible in the present construction.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent, is:

1. The combination in a balancing machine having a frame adapted to tilt from its normal position, of aligned bearings on said frame, and a rigid supporting member journaled in said bearings, having means between the bearings adapted to carry the part to be balanced in coaxial alignment on said member.

2. The combination in a balancing machine having a tiltably mounted frame, of a rigid supporting member rotatably mounted on the frame, and means on said member adapted to clamp the part to be balanced at a plurality of points along its length and in alignment with the axis of rotation of said member.

3. The combination in a balancing machine having a frame pivotally mounted to oscillate from a neutral position, of a balanced supporting member mounted on said frame to rotate about an axis in a plane normal to the axis of oscillation, and means on said supporting member to rigidly clamp the part to be balanced in coaxial alignment with said member.

4. The combination in a balancing machine for rotating parts having a pivotally movable frame, of a rigid supporting member mounted for rotation on said frame, and spaced means on the member to secure said part to be balanced coaxially thereon.

5. The combination in a balancing machine for rotating parts having a pivotally movable frame, of a work support rotatably mounted on said frame having a driving and balancing head coaxial therewith, and means to secure the part to be balanced to said support with its axis of rotation in the axis of rotation of said member.

6. In a balancing machine for rotatable parts, a rigid supporting member supported at its ends and rotatable coaxially with the part to be balanced, said member having means to clamp said part in position thereon between its supports.

7. In a balancing machine for rotatable parts, a rotatable supporting member adapted to clamp the part to be balanced at a plurality of separated points along its length and hold it without deflection during rotation thereof for the determination of unbalance.

8. In a balancing machine for rotatable parts having a tiltable frame and a driving and balancing head thereon, the combination of a rigid supporting member rotatably mounted in the frame coaxially with said head, and clamping means carried by the supporting member to secure the part to be balanced in alignment with said member and head.

9. In a balancing machine for rotatable parts having a tiltable frame and a driving and balancing head thereon, the combination of a rigid supporting member secured to and rotatable with said head, means to secure the part to be balanced in coaxial relation on said member, and means to rotate said head and member.

10. In a machine for balancing rotatable parts, means for supporting the part to be balanced comprising a divided housing having spaced transverse members formed in two parts, hinge means connecting said parts, journal portions whereon the supporting member is rotatably mounted, and means carried between the parts of the transverse members to rigidly secure the part to be balanced with its principal axis coincident with the axis of rotation of the supporting device.

11. In a machine for balancing rotatable parts, a supporting device comprising longitudinal and transverse members forming a balancing housing, and means carried by the transverse members to rigidly secure the part to be balanced in balancing position in said housing.

12. In a balancing machine for rotatable parts, a rotatable element comprising a rigid supporting member formed in two parts, and clamping means between the parts to retain the part to be balanced in position thereon with its axis on the axis of rotation.

13. In a machine for balancing rotatable parts, a supporting device comprising two-part transverse members, longitudinal members rigidly secured to said transverse members, journals whereon said supporting device is rotatably mounted, and clamping means between the parts of the transverse members adapted to engage and support the part to be balanced.

14. In a machine for balancing rotatable parts, a supporting device for said part comprising transverse web members each divided to form a split hub, longitudinal members connecting the corresponding parts of each web member, one of said longitudinal members forming a pin adapted to connect the parts of each web member, and clamp means carried by said split hub to rigidly secure the part to be balanced coaxially with the supporting means.

In testimony whereof I affix my signature.

WALTER R. GRISWOLD.